Patented Sept. 27, 1932

1,879,505

UNITED STATES PATENT OFFICE

OTTO RIPKE, OF WUPPERTAL-ELBERFELD, GERMANY, ASSIGNOR TO WINTHROP CHEMICAL COMPANY, INC., OF NEW YORK, N. Y., A CORPORATION OF NEW YORK

ORGANIC GOLD COMPLEX COMPOUND AND PROCESS OF MAKING SAME

No Drawing. Application filed April 24, 1931, Serial No. 532,711, and in Germany May 3, 1930.

The present invention relates to new gold complex compounds of sulfhydryl-albumoses and to a process of preparing the same.

In accordance with the present invention gold complex compounds of sulfhydryl-albumoses, which are degradation products containing sulfhydryl groups of keratin substances, such as wool, hair, horn and the like, and are obtainable according to the process of the co-pending application Serial No. 497,066, i. e. by subjecting the keratin substance in an aqueous mineral acid medium to hydrolysis until solution takes place and to reduction, are produced by reacting upon a solution of the sulfhydryl-albumose with at most such a quantity of a gold salt that the coloration resulting from the addition of the gold salt just disappears, yielding proof that the gold salt is combined with the sulfhydryl-albumose presumably by reaction of the sulfhydryl group of the albumose with the gold salt, and then neutralizing the reaction mixture.

The reaction may be preferably performed in aqueous solution, but also organic solvents which are capable of dissolving the starting materials and are inert thereto, for instance, alcohols, such as methyl and ethyl alcohol, have proved operable. I prefer to use as the gold salt the most accessible gold chloride or gold chloride-sodium chloride in the form of an aqueous or alcoholic solution; however, it is obvious that also other gold salts, which are soluble in water or organic solvents, may be employed, for instance, gold bromide and gold cyanide. The reaction which may be initiated in acid or neutral solution is finally rendered neutral by means of an alkali metal hydroxide or carbonate or by a nitrogen containing base, such as ammonia and its substitution products, for instance, dimethylamine, diethylamine, ethylenediamine, diethylamino-ethanol, or pyridine, piperidine, piperazine and the like. The gold complex compound formed is precipitated from the solution obtained by means of an organic water-soluble solvent, for example, alcohol, whereas it separates off directly when neutralizing the alcoholic reaction solution. Depending upon the quantity of the gold salt added, gold complex compounds of the sulfhydryl-albumoses containing different quantities of gold, for example, 1 to 4%, may be obtained in this manner. The content of sulfur is dependent on the starting material used and amounts, for instance, when starting with a sulfhydryl-albumose obtained from wool, to about 5%.

In general the new gold complex compounds are somewhat contaminated with the salt formed by the neutralization process, for instance, sodium chloride. It may be mentioned that this fact is without disadvantage for the therapeutic use of my new products. After drying in vacuo the new gold complex compounds are weakly colored powders which are readily soluble in water to an almost colorless solution, but insoluble in organic solvents, and decompose on heating without distinctly melting. The aqueous solution does not separate off gold after the same is rendered alkaline. In 20% hydrochloric acid the gold complex compounds dissolve without changing.

As the chemical structure of the starting materials is not known with certainty, I am not able to give a structural formula for my new gold complex compounds of the sulfhydryl-albumoses.

The following example illustrates the invention without restricting it thereto:

Example 200 grams of wool are heated with 1000 grams of dilute hydrochloric acid and 20 grams of tin on the water bath until (after about 1 hour) solution takes place. The hydrochloric acid solution obtained is freed from tin by means of hydrogen sulfide and evaporated in vacuo at 50° C. to a syrupy consistency while passing through an indifferent gas. Hair or horn shavings may be treated in the same manner instead of wool.

The syrup obtained is dissolved with a small quantity of water and is gradually mixed with a 20% aqueous solution of gold chloride until the red coloration first appearing just disappears and the original yellow coloration of the solution is just regenerated. Generally about 25 ccs. of the gold chloride solution are required for this purpose. After neutralizing with caustic soda lye while cooling with ice, the albumose gold compound is precipitated together with common salt by means of alcohol. The product obtained is, after washing with alcohol and drying in vacuo, of a pale color and contains about 3.5% of gold bound in complex form. It may be directly employed for therapeutic use.

When using instead of caustic soda lye for neutralizing the reaction mixture, for instance, potassium hydroxide, sodium or potassium carbonate, ammonia, dimethylamine, ethylenediamine, diethylamino-ethanol, pyridine, piperidine, piperazine or the like, products displaying analogous properties are obtained.

Alternatively for producing the gold complex compound the syrup above described may be directly neutralized and an aqueous solution of gold chloride-sodium chloride may be added according to the directions above given. From the resulting solution the gold complex compound is precipitated by means of alcohol as above described.

The reaction may also be performed by causing an alcoholic solution of the above described syrup to act on an alcoholic gold chloride solution and precipitating the albumose gold compound by neutralizing with alcoholic caustic soda.

I claim:—

1. The process which comprises reacting upon a sulfhydryl-albumose which is a degradation product containing sulfhydryl groups of a keratin substance in the presence of a solvent with at most such a quantity of a gold salt soluble in the solvent used that the coloration, resulting from the addition of the gold salt, just disappears and neutralizing the reaction mixture.

2. The process which comprises reacting upon a sulfhydryl-albumose which is a degradation product containing sulfhydryl groups of a keratin substance in the presence of a solvent of the group consisting of water, methyl and ethyl alcohol, with at most such a quantity of a gold salt soluble in the solvent used that the coloration, resulting from the addition of the gold salt, just disappears and neutralizing the reaction mixture.

3. The process which comprises reacting upon a sulfhydryl-albumose, which is a degradation product containing sulfhydryl groups of a keratin substance in the presence of a solvent of the group consisting of water, methyl and ethyl alcohol, with at most such a quantity of a gold-chloride salt that the coloration, resulting from the addition of the gold-chloride salt, just disappears and neutralizing the reaction mixture.

4. The process which comprises reacting upon an aqueous solution of a sulfhydryl-albumose which are a degradation product containing sulfhydryl groups of a keratin substance with at most such a quantity of an aqueous gold-chloride solution that the coloration, resulting from the addition of the gold-chloride salt, just disappears and neutralizing the reaction mixture.

5. The process which comprises reacting upon a sulfhydryl-albumose which are a degradation product containing sulfhydryl groups of a keratin substance in the presence of a solvent with at most such a quantity of a gold salt soluble in the solvent used that the coloration, resulting from the addition of the gold salt, just disappears and neutralizing the reaction mixture with an alkali metal hydroxide.

6. The process which comprises reacting upon a sulfhydryl-albumose which is a degradation product containing sulfhydryl groups of a keratin substance in the presence of a solvent of the group consisting of water, methyl and ethyl alcohol, with at most such a quantity of a gold salt soluble in the solvent used that the coloration, resulting from the addition of the gold salt, just disappears and neutralizing the reaction mixture with an alkali metal hydroxide.

7. The process which comprises reacting upon a sulfhydryl-albumose which is a degradation product containing sulfhydryl groups of a keratin substance in the presence of a solvent of the group consisting of water, methyl and ethyl alcohol, with at most such a quantity of a gold-chloride salt that the coloration, resulting from the addition of the gold-chloride salt, just disappears and neutralizing the reaction mixture wih an alkali metal hydroxide.

8. The process which comprises reacting upon an aqueous solution of a sulfhydryl-albumose which is a degradation product containing sulfhydryl groups of a keratin substance with at most such a quantity of an aqueous gold-chloride solution that the coloration, resulting from the addition of the gold-chloride salt, just disappears and neutralizing the reaction mixture with caustic soda lye.

9. The process which comprises reacting upon an aqueous solution of the sulfhydryl-albumose, obtained by heating 200 parts by weight of wool with 1000 parts by weight of dilute hydrochloric acid and 20 parts by weight of tin on the water bath until solution takes place, freeing the solution produced from tin by means of hydrogen sulfide and evaporating in vacuo, with such a quantity of a 20% aqueous solution of gold-chloride that the coloration, resulting from the addition of the gold-chloride solution just disappears, neutralizing the reaction mixture with caustic soda lye while cooling and precipitating the sulfhydryl-albumose gold complex compound by means of alcohol.

10. Gold complex compounds of a sulfhydryl-albumose, obtained in accordance with the process claimed in claim 1, said products being pale colored powders, soluble in water to almost colorless, neutrally reacting solutions, insoluble in organic solvents and suitable for therapeutic use.

11. Gold complex compounds of a sulfhydryl-albumose, obtained in accordance with the process claimed in claim 2, said products being pale colored powders, soluble in water to almost colorless, neutrally reacting solutions, insoluble in organic solvents and suitable for therapeutic use.

12. Gold complex compounds of a sulfhydryl-albumose, obtained in accordance with the process claimed in claim 3, said products being pale colored powders, soluble in water to almost colorless, neutrally reacting solutions, insoluble in organic solvents and suitable for therapeutic use.

13. Gold complex compounds of a sulfhydryl-albumose, obtained in accordance with the process claimed in claim 4, said products being pale colored powders, soluble in water to almost colorless, neutrally reacting solutions, insoluble in organic solvents and suitable for therapeutic use.

14. Gold complex compounds of a sulfhydryl-albumose, obtained in accordance with the process claimed in claim 5, said products being pale colored powders, soluble in water to almost colorless, neutrally reacting solutions, insoluble in organic solvents and suitable for therapeutic use.

15. Gold complex compounds of a sulfhydryl-albumose, obtained in accordance with the process claimed in claim 6, said products being pale colored powders, soluble in water to almost colorless, neutrally reacting solutions, insoluble in organic solvents and suitable for therapeutic use.

16. Gold complex compounds of a sulfhydryl-albumose, obtained in accordance with the process claimed in claim 7, said products being pale colored powders, soluble in water to almost colorless, neutrally reacting solutions, insoluble in organic solvents and suitable for therapeutic use.

17. Gold complex compounds of a sulfhydryl-albumose, obtained in accordance with the process claimed in claim 8, said products being pale colored powders, soluble in water to almost colorless, neutrally reacting solutions, insoluble in organic solvents and suitable for therapeutic use.

18. The gold complex compound of a sulfhydryl-albumose, obtained in accordance with the process claimed in claim 9, said product being a pale colored powder containing about 3.5% of gold, being soluble in water to an almost colorless, neutrally reacting solution, being insoluble in organic solvents and being suitable for therapeutic use.

In testimony whereof, I affix my signature.

OTTO RIPKE.